Oct. 22, 1963    J. A. NIEL    3,107,434
ARTICULATED RULER
Filed Nov. 4, 1960    2 Sheets-Sheet 1
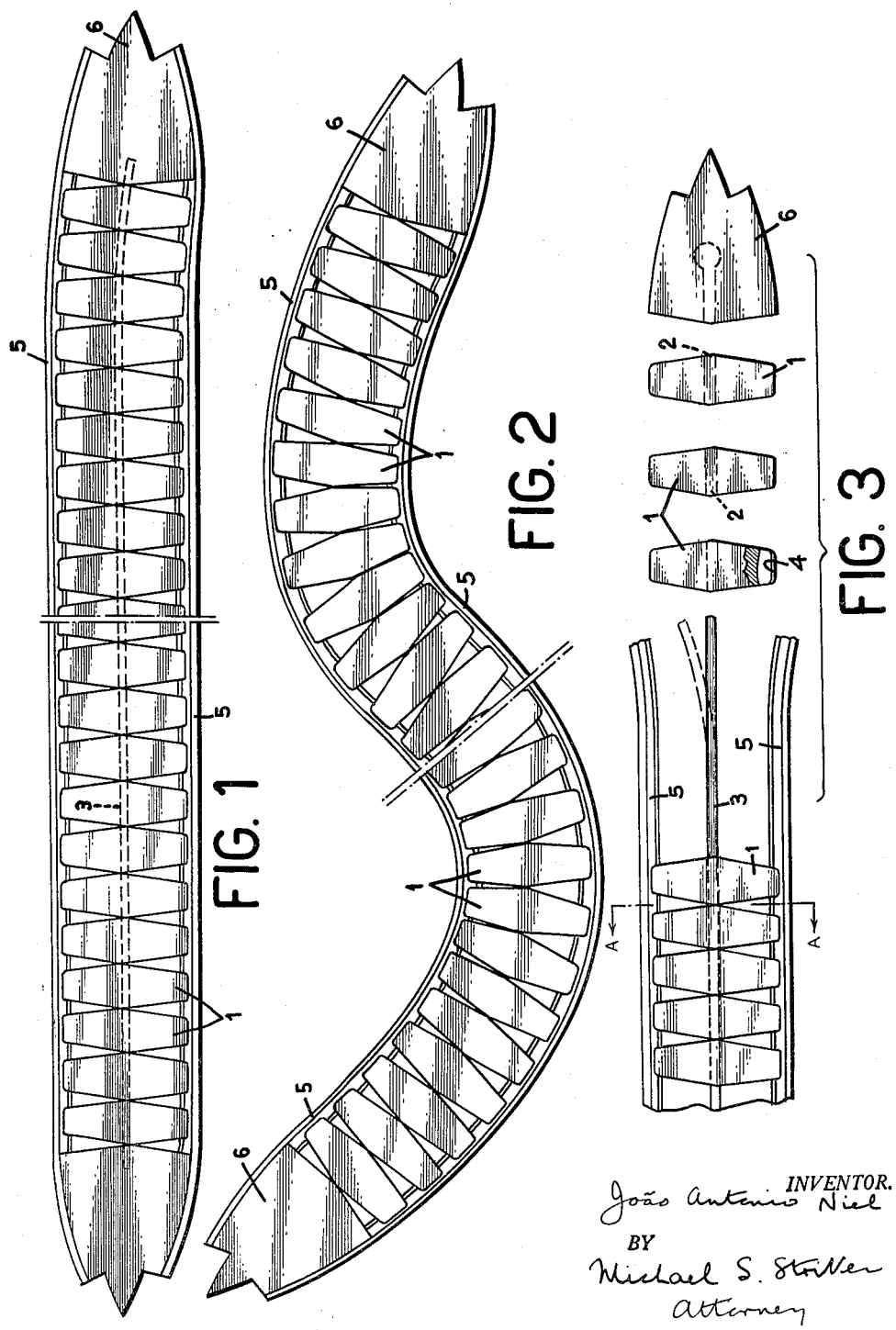

Oct. 22, 1963   J. A. NIEL   3,107,434
ARTICULATED RULER
Filed Nov. 4, 1960  2 Sheets-Sheet 2
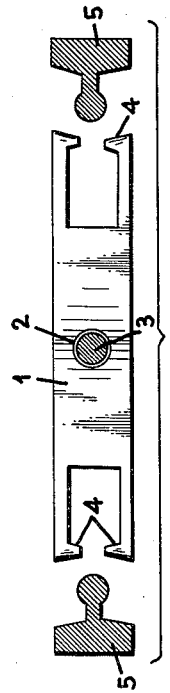
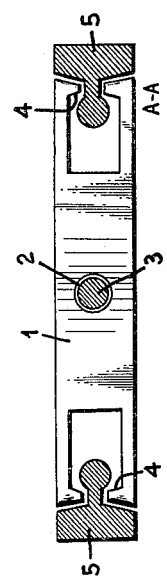
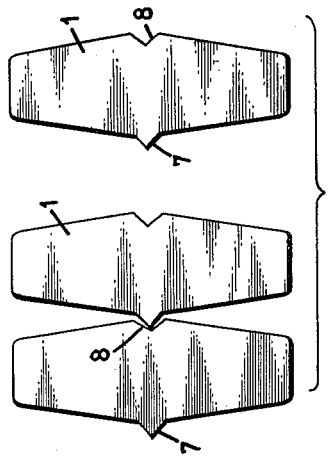
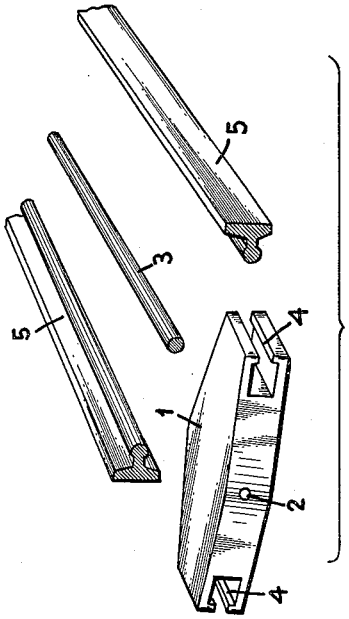
INVENTOR.
João Antonio Niel
BY Michael S. Striker
Attorney

United States Patent Office 3,107,434
Patented Oct. 22, 1963

3,107,434
ARTICULATED RULER
João A. Niel, Sao Paulo, Brazil, assignor to Cia. de Administracao e Comercio Schmidt-Kaltenbach, Sao Paulo, Brazil
Filed Nov. 4, 1960, Ser. No. 67,433
Claims priority, application Brazil Apr. 8, 1960
4 Claims. (Cl. 33—177)

The present invention relates to a new articulated ruler for drawings which has been conceived to be used with great simplicity and convenience, constituting a really new and practical device.

This new ruler constitutes an instrument of great value for engineers, draftsmen and technicians in general, for with it one can trace any kind of curves with various radii, even those having ultra-small dimensions, always obtaining the best possible results.

This articulated ruler, due to its ingenious construction, adapts itself to practically every kind of arcs of circle, maintaining perfect stability after the curve is defined.

The enclosed drawings illustrate the present invention, in which:

FIG. 1 is a plane view of the new ruler in a straight position;

FIG. 2 is a plane view of the new ruler in a curved position;

FIG. 3 illustrates the mounting operation of the various parts of the ruler;

FIG. 4 is a cross-section through line A—A of FIG. 3;

FIG. 5 is the same cross-section of FIG. 4 with its parts separated;

FIG. 6 is a perspective of the parts of the ruler taken separately;

FIG. 7 is a detailed view of the ruler under a new form of execution.

According to the enclosed drawings, the articulated ruler, object of the present invention, is formed by several pieces 1, more or less of lozengular form; these pieces 1 have their central part widened and provided with a hole. The pieces are aligned side by side and linked together with a flexible but not elastical wire.

Said lozengular pieces 1 have their opposite sides forming claws 4 or equivalent fitting device by which they are applied to longitudinal flexible guides 5.

Besides the lozengular pieces 1, the new ruler is also provided with end plates 6 also fitted between the guides 5 to hold the pieces together and also to provide a fastening means for the wire 3.

The ruler thus constituted can be handled easily, to be curved in any desired form, by the inclination of the lozengular elements in relation one to the other (FIG. 2).

The FIG. 7 illustrates another form of execution of the ruler in which the elements 1, also of more or less lozengular form, are provided on the opposite sides of their median plane with an angular tooth or projection 7 and an indentment or cutout 8 also angular by which they are held together. These teeth and indentments form the points of support for the relative inclination of the elements 1. The angular projection 7 on one side of one element 1 engages in the corresponding angular cutout on the other side of the following element 1, and since the included angle between the side faces of the angular cutout 8 is greater than that of the angular projection 7, the elements may tilt with respect to each other.

Having thus described my invention, what I claim is:

1. An articulated ruler comprising, in combination, a plurality of plate elements having each its greatest width at a median plane thereof and gradually decreasing in width from said median plane towards opposite end portions thereof, each of said plate elements being formed with a bore therethrough extending substantially in said median plane; elongated flexible means extending through the bores of said plurality of plate elements for linking said plate elements to each other with successive plate elements respectively abutting against each other at edge portions located in said median plane and with successive plate elements tiltable with respect to each other; and a pair of continuous flexible guide means extending respectively longitudinally along said opposite end portions of said linked elements and being slidably attached thereto.

2. An articulated ruler comprising, in combination, a plurality of plate elements having each its greatest width at a median plane thereof and gradually decreasing in width from said median plane towards opposite end portions thereof, each of said plate elements being formed with a bore therethrough extending substantially in said median plane; a flexible non-elastic wire extending through the bores of said plurality of plate elements for linking said plate elements to each other with successive plate elements respectively abutting against each other at edge portions located in said median plane and with successive plate elements tiltable with respect to each other; and a pair of continuous flexible guide means extending respectively longitudinally along said opposite end portions of said linked elements and being slidably attached thereto.

3. An articulated ruler comprising, in combination, a plurality of plate elements having each its greatest width at a median plane thereof and gradually decreasing in width from said median plane towards opposite end portions thereof, each of said plate elements having a triangular projection of a given apex angle projectioning in the region of said median plane from one side edge thereof and being formed in the region of said median plane with a triangular cutout with an apex angle greater than said given apex angle and extending into the plate member from the side edge opposite said one side edge, said plate members being arranged in a row with the projection on one plate member extending into the cutout of the plate member adjacent thereto so that said plate members are tiltable with respect to each other; and a pair of continuous flexible guide members extending respectively longitudinally along said opposite end portions of said plate elements and being slidably attached thereto.

4. An articulated ruler comprising, in combination, a plurality of plate elements having each its greatest width at a median plane thereof and gradually decreasing in width from said median plane towards opposite end portions thereof, each of said opposite end portions being formed with a pair of claws, each of said plate elements being formed with a bore therethrough extending substantially in said median plane; elongated flexible means extending through the bores of said plurality of plate elements for linking said plate elements to each other with successive plate elements respectively abutting against each other at edge portions located in said median plane and with successive plate elements tiltable with respect to each other; and a pair of continuous flexible guide means extending respectively longitudinally along said opposite end portions of said linked elements, each of said guide means having a web formed along one edge thereof with a thickened portion, said web extending between said pair of claws of said plurality of plate elements and said thickened portion being arranged inwardly of said claws so as to retain said guide means attached to said plate elements.

References Cited in the file of this patent

UNITED STATES PATENTS 2,116,563    Danielson _____ May 10, 1938

FOREIGN PATENTS 350,776    Italy _____ July 22, 1937